United States Patent [19]

Horie

[11] Patent Number: 5,164,577
[45] Date of Patent: Nov. 17, 1992

[54] OPTICAL RECORDING MEDIUM WITH REGION FOR IDENTIFYING DEFECTIVE WRITTEN DATA

[75] Inventor: Kiyoshi Horie, Kanagawa, Japan
[73] Assignee: Kabushiki Kaisha CSK, Tokyo, Japan
[21] Appl. No.: 573,134
[22] PCT Filed: Jan. 19, 1990
[86] PCT No.: PCT/JP90/00057
§ 371 Date: Oct. 2, 1990
§ 102(e) Date: Oct. 2, 1990
[30] Foreign Application Priority Data Jan. 20, 1989 [JP] Japan ................. 1-11514

[51] Int. Cl.⁵ .............. G06K 19/06; G11B 7/007
[52] U.S. Cl. ................... 235/494; 235/487; 369/59; 369/275.3
[58] Field of Search ............ 235/454, 487, 494; 369/275.3, 59, 58, 54

[56] References Cited

U.S. PATENT DOCUMENTS

| | | | |
|---|---|---|---|
| 4,733,386 | 3/1986 | Shimoi | 369/59 |
| 4,811,124 | 3/1989 | Dujari et al. | 369/59 |
| 4,833,665 | 5/1989 | Tokumitsu et al. | 369/58 |
| 4,964,094 | 10/1990 | Satoh et al. | 369/59 |
| 4,979,159 | 12/1990 | Tsuruoka et al. | 235/494 |
| 5,005,165 | 4/1991 | Yamanaka et al. | 369/58 |

FOREIGN PATENT DOCUMENTS

| | | | |
|---|---|---|---|
| 3728857 | 3/1988 | Fed. Rep. of Germany | 369/58 |
| 58-35733 | 3/1983 | Japan | 369/58 |
| 60-29975 | 2/1985 | Japan | |
| 61-246962 | 11/1986 | Japan | |
| 61-279957 | 12/1986 | Japan | |
| 63-14379 | 1/1988 | Japan | 369/58 |
| 63-183664 | 7/1988 | Japan | 369/58 |

Primary Examiner—Robert Weinhardt
Attorney, Agent, or Firm—Lackenbach Siegel Marzullo & Aronson

[57] ABSTRACT

A card type optical recording medium according to the present invention relates to a card type optical recording medium arranged in such a manner that a plurality of tracks are formed on a recording region provided on a card type substrate and the tracks are divided into a plurality of blocks so that data is optically recorded to each of the blocks. The card type optical recording medium according to the present invention is characterized in that a portion of the recording region is provided with a defective block information region for determining a good or bad condition of the block to which the data is recorded. As a result, the defective block information can be read prior to the reading of data. Therefore, the necessity of accessing the defective block can be eliminated, causing a good reading efficiency to be realized. Furthermore, since the conventional necessity of writing the serial number to the block of the data recording region can be eliminated, an effect can be obtained in that the data capacity of the data recording region can be enlarged.

10 Claims, 3 Drawing Sheets

[5,164,577]

OPTICAL RECORDING MEDIUM WITH REGION FOR IDENTIFYING DEFECTIVE WRITTEN DATA

TECHNICAL FIELD

The present invention relates to a card type optical recording medium for optically writing and reading data.

BACKGROUND ART

Recently, a card type optical recording medium (to be called an "optical memory card" hereinafter), arranged in such a manner that a plurality of tracks are formed in a recording region provided on a card type substrate so that data may be optically read and written along the tracks thus formed, has attracted attention.

A conventional optical memory card has, as shown in FIG.3, a recording region 11, to which data can be written and from which data can be read, on a card type substrate 10 thereof. Furthermore, a multiplicity of elongated tracks 12 are formed in the recording region 11. The recording region 11 is mainly divided into a data region 13 to which data is recorded and a directory region 14 to which recording addresses of the recording data or the like are written.

Each of the tracks 12 in the data recording region 13 is divided into, for example, three blocks 15 as shown in FIG. 4. As a result, when a file (a set of data items) is written to the track 12, the file is divided into sections which correspond to the blocks 15 so that the divided sections are sequentially written. A number recording portion 16 to which the address of each of the blocks 15 is written in the form of a binary code is formed in the leading portion of each of the blocks 15 so that the blocks 15 can be distinguished from one another. In the case of a write error, the same address as that for the erroneous block is written to the next block. As a result, it is arranged in such a manner that, if the same address are successively read, the latter block is read.

As shown in FIG. 5, a file entry 20 to which the name and the attribute of the file are recorded, a start block number portion 21, to which the address of the first block 15 to which the above-described file is written, is written and an end block number portion 22 to which the address of the last block 15 is written, are formed in each of the tracks 12 in the directory region 14 in such a manner that they correspond to the file recorded to the data recording region 13.

The optical memory card structured as described above sometimes includes a defective block in which data cannot be written and read from the track 12 of the data recording region 13. Therefore, when data is desired to be read, the good or bad condition of the block 15 is determined whenever the block 15 is accessed. If it has been determined that the subject block 15 is defective, the reading of that block 15 is neglected and the next block 15 is accessed. Therefore, when the conventional optical memory card is accessed, all of the blocks 15 must be accessed so as to determine the good or bad condition of all of the blocks 15 before data is read. As a result, a problem arises in that the reading speed may be deteriorated by a degree corresponding to the number of accessing of the defective blocks.

Furthermore, another problem arises in that the data capacity becomes reduced since the address must be written to the blocks 15 in the data recording region 13.

SUMMARY OF THE INVENTION

In order to overcome the above-described conventional problems, an aspect of the present invention comprises a card type optical recording medium arranged in such a manner that a plurality of tracks are formed on a recording region provided on a card type substrate and the tracks are divided into a plurality of blocks so that data is optically recorded to each of the blocks. The card type optical recording medium is characterized in that: a portion of the recording region is provided with a defective block information region for determining the good or bad condition of the block(s) to which the data is recorded.

It is preferable that the defective block information region has a region to which a bit expressing the good or bad condition of each of the blocks is written corresonding to each of the blocks.

Furthermore, another aspect of the present invention lies in a card type optical recording medium, wherein the recording region provided on the card type substrate includes a data recording region, a directory region and a defective block information region and the regions respectively have the blocks by the same number for one track.

One block of the defective block information region may be made to correspond to one track of the data recording region. Furthermore, data denoting good or bad data blocks and recorded in one block of the defective block information region may be a bit having a length corresponding to one byte which expresses the state of two tracks of the data recording region.

As described above, according to the card type optical recording medium according to the present invention, since the defective block information can be read prior to the reading of data, the necessity of accessing a defective data block can be eliminated, permitting good reading efficiency to be realized.

Furthermore, since the conventional necessity of writing the address to the block of the data recording region can be eliminated, the data capacity of the data recording region can be enlarged.

DESCRIPTION OF A PREFERRED EMBODIMENT

An embodiment of the present invention will be described in detail with reference to drawings.

Figure 1:
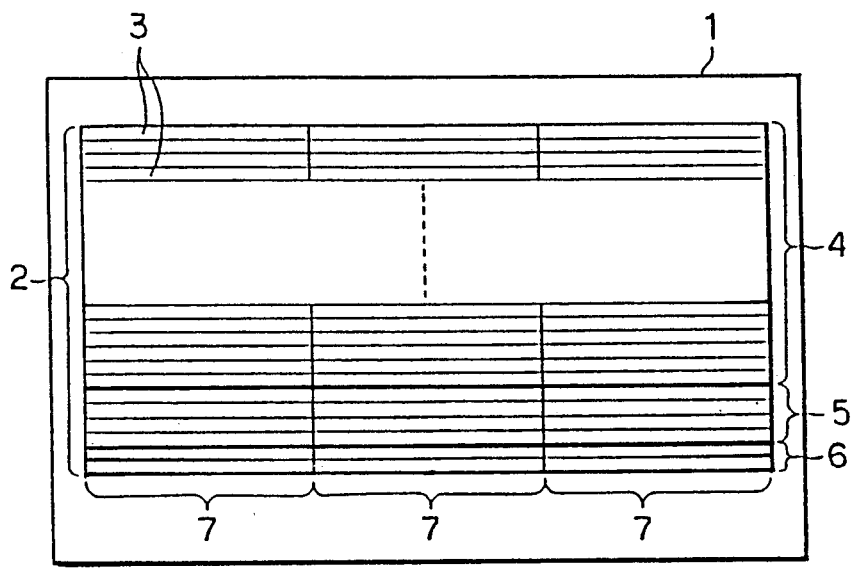
FIG. 1 is plan view which illustrates an embodiment of a card type optical recording medium according to the present invention.
Figure 2:
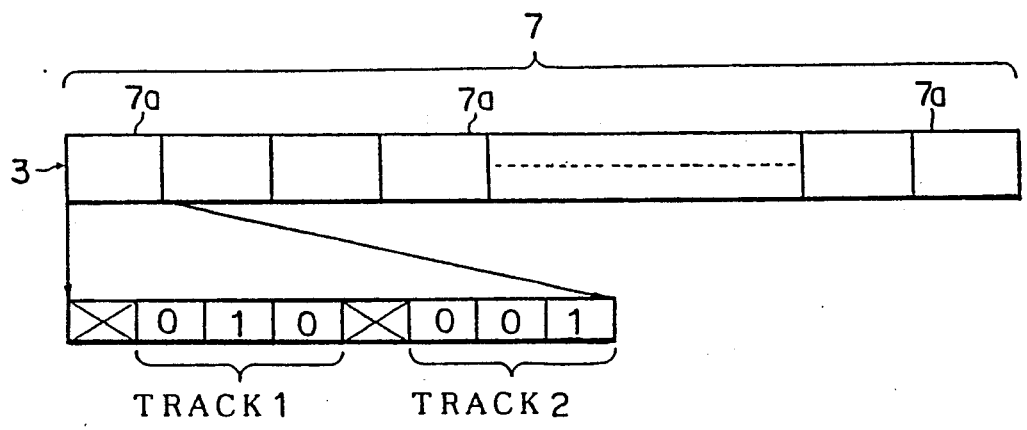
FIG. 2 illustrates the structure of tracks in a defective block information region of the same.
Figure 3:
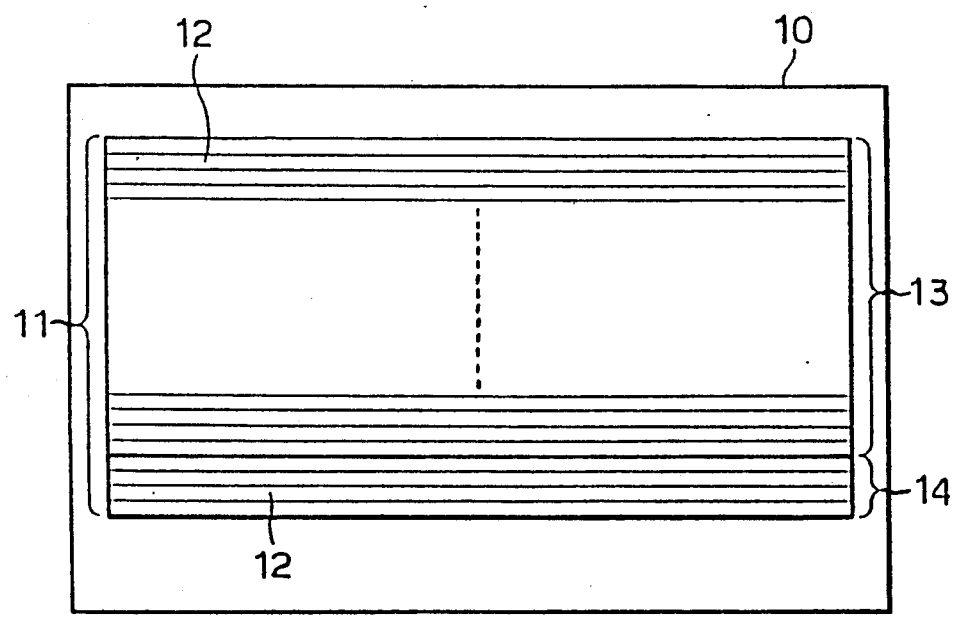
FIG. 3 is a plan view which illustrates an example of a conventional card type optical recording medium.

FIG. 1 is a plan view which illustrates an embodiment of an optical memory card according to the present invention.

The optical memory card according to this embodiment is arranged to have a multiplicity of tracks 3 formed in a recording region 2 provided for a card type substrate 1, the tracks 3 being divided into a data recording region 4 to which data (file) is recorded, a directory region 5 and a defective block information region 6.

Figure 4:
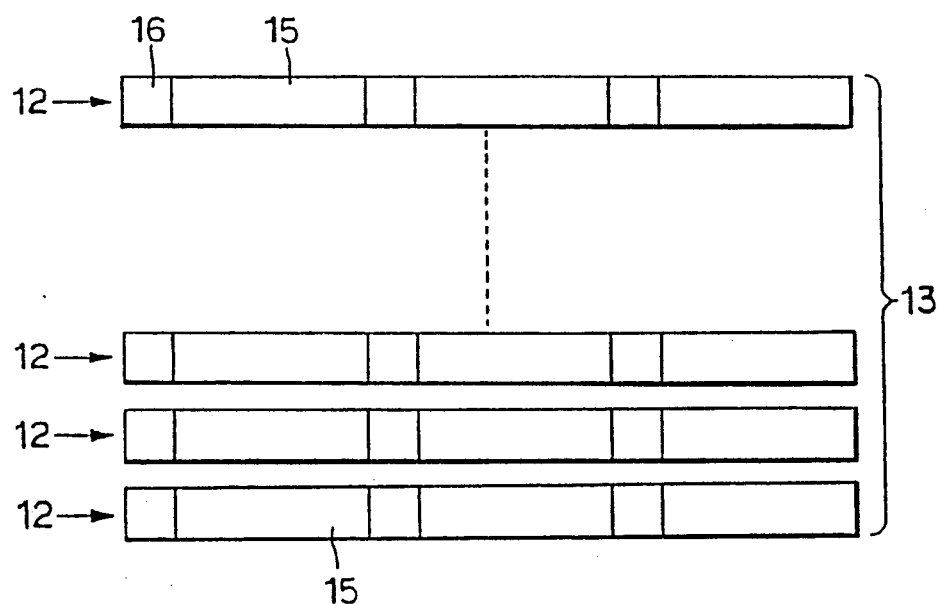
FIG. 4 illustrates the structure of a data recording region of the same.
Figure 5:
FIG. 5 illustrates the structure of the director region of the same.

The above-described data recording region 4, the directory region 5 and the defective block information region 6 are, similarly to the structure as shown in FIG. 4, constituted in such a manner that the track 3 is divided into three blocks 7. The directory region 5 is, similarly to the structure as shown in FIG. 5, arranged in such a manner that the start block, the end block and the like of the file written to the data recording region 4 are recorded thereto. In the case where thousands of tracks 3 are formed in the recording region 2, several to several tens of tracks 3 are assigned to the defective block information region 6 and the directory region 5, respectively. The rest is assigned to the data recording region 4.

The above-described defective block information region 6 is arranged in such a manner that its blocks 7 are respectively divided into a plurality of regions 7a to which defective block information of the data recording region 4 is written in a unit of one byte. Furthermore, the above-described defective block information is written to the above-described regions 7a. The defective block information for one block is arranged to be expressed by a segment of the upper four bits and another block by the lower four bits of the region 7a having a total length corresponding to one byte.

That is, the leading bit of the upper four bits and that of the lower four bits which constitute the region 7a are neglected and the good or bad status of the block included in one track 3 of the data recording region 4 is determined by whether the residual three bits are turned on (0) or off (1). For example, it is arranged in such manner that, if the three bits are turned off, it is an indication that the subject block is defective.

It is arranged in such a manner that the defective block information items are successively arranged in the above-described defective block information region 6 corresponding to the block of the data recording region 4.

According to the above-described structure, block information for two tracks can be expressed by one region 7a. Therefore, the defective block information for 1024 blocks can be recorded in each block 7 since the block 7 of the defective block information region 6 has a length corresponding to 512 bytes. The address is written to the leading region of the block 7. In the case where a write error takes place at the time of the writing of the defective block information, the same address is written to the next block 7. As a result, data in the next block 7 is read if the same addresses are read successively.

In the case where data is written to the above-described optical memory card, the same data is written as it is as an alternative to the conventional structure in which the same address is given to the next block if a write error has taken place. Furthermore, the defective information is written to the region 7a of the defective block region 6 which corresponds to the block in which the write error has taken place. Therefore, according to the optical memory card according to this embodiment, the conventional necessity of writing the address to the block of the data recording region 4 can be eliminated.

In the case where the above-described optical memory card is read, the directory region 5 and the defective block information region 6 are first read so as to have the contents thus read stored in the memory. Then, data in the data recording region 4 is read in accordance with the directory region information and the defective block information stored in the above-described memory. As described above, if the defective block information has been previously read and the reading of the data recording region 4 is performed with reference to the above-described defective block information, the necessity of accessing of the defective block can be eliminated, causing a good reading efficiency to be realized.

The structure of the defective block information region 6 is not limited to the above-made description according to the present invention. For example, a structure may be employed in which the track 3 is divided into small blocks each of which is constituted by three bits so that the defective block information for one track is written to one block. Although a structure is described in which the track 3 of the data recording region 4 is divided into three blocks, the number of the sections is not limited to this.

What is claimed is:

1. A card type optical recording medium comprising a substrate provided with a layer of a recording medium having a recording region partitioned into a data recording region and a defective block information region, a plurality of recording tracks arranged in said regions, each track having at least one block to which digital data can be optically recorded; said data recording region including a number of recording tracks greater than the number of recording tracks in said defective block information region, said at least one block of a track in said defective block information region being partitioned into a plurality of segments each of which corresponds to an associated block in said data recording region on which there is recorded a plurality of bits of information necessary to identify whether an associated block in said data recording region contains valid or invalid data, such plurality of bits identifying valid or invalid data appearing only in said segments within said defective block information region, whereby initially reading said plurality of bits in said plurality of segments obviates the need to read the digital data in blocks in said data recording region in which invalid data has been recorded.

2. An optical recording medium as defined in claim 1, wherein said recording region further comprises a directory region including at least one recording track for addresses of said blocks in said data recording region.

3. An optical recording medium as defined in claim 2, wherein the number of blocks in each of said tracks is equal.

4. An optical recording medium as defined in claim 1, wherein the number of blocks in each of said tracks is equal.

5. An optical recording medium as defined in claim 1, wherein each of said tracks is divided into three blocks.

6. An optical recording medium as defined in claim 1, wherein each segment includes three bits of information.

7. An optical recording medium as defined in claim 1, wherein each block within each track in said defective block information region contains 512 bytes.

8. An optical recording medium as defined in claim 7, wherein each byte represents two segments, whereby each block within each track in said defective block information region represents 1024 blocks of data within said data recording region.

9. An optical recording medium as defined in claim 8, wherein each byte contains eight bits, one segment being represented by the lower four bits of each byte and another segment being represented by the upper four bits of each byte.

10. An optical recording medium as defined in claim 9, wherein each segment utilizes only three bits of each of said upper and lower four bits by omitting the least significant bit in each four bit grouping.

* * * * *